United States Patent
Yang et al.

(10) Patent No.: US 9,137,796 B2
(45) Date of Patent: Sep. 15, 2015

(54) METHOD AND APPARATUS FOR MONITORING SCHEDULING INFORMATION

(75) Inventors: Suck Chel Yang, Anyang-si (KR); Min Gyu Kim, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 136 days.

(21) Appl. No.: 13/881,340

(22) PCT Filed: Feb. 8, 2012

(86) PCT No.: PCT/KR2012/000932
§ 371 (c)(1),
(2), (4) Date: Apr. 24, 2013

(87) PCT Pub. No.: WO2012/108688
PCT Pub. Date: Aug. 16, 2012

(65) Prior Publication Data
US 2013/0215875 A1    Aug. 22, 2013

Related U.S. Application Data

(60) Provisional application No. 61/441,614, filed on Feb. 10, 2011.

(51) Int. Cl.
*H04W 72/04*    (2009.01)
*H04W 72/12*    (2009.01)
*H04W 36/38*    (2009.01)

(52) U.S. Cl.
CPC ...... *H04W 72/0446* (2013.01); *H04W 72/1273* (2013.01); *H04W 36/385* (2013.01)

(58) Field of Classification Search
USPC ............... 370/328–336; 375/260; 380/287
See application file for complete search history.

(56) References Cited

U.S. PATENT DOCUMENTS

| | | | |
|---|---|---|---|
| 2010/0254268 A1* | 10/2010 | Kim et al. | 370/241 |
| 2011/0075624 A1* | 3/2011 | Papasakellariou et al. | 370/329 |
| 2011/0110441 A1* | 5/2011 | Chen et al. | 375/260 |
| 2013/0016841 A1* | 1/2013 | Fong et al. | 380/287 |

FOREIGN PATENT DOCUMENTS

| | | |
|---|---|---|
| KR | 10-2008-0084736 | 9/2008 |
| KR | 10-2010-0014118 | 2/2010 |
| KR | 1020100078232 | 7/2010 |
| KR | 1020100120607 | 11/2010 |
| KR | 1020100121434 | 11/2010 |
| KR | 1020100137357 | 12/2010 |

OTHER PUBLICATIONS

Korean Intellectual Property Office Application Serial No. 10-2013-7009564, Office Action dated Feb. 10, 2015, 4 pages.

* cited by examiner

*Primary Examiner* — Vincelas Louis
(74) *Attorney, Agent, or Firm* — Lee, Hong, Degerman, Kang & Waimey (57) ABSTRACT

Provided are a method and apparatus for monitoring scheduling information in a wireless communication system. A terminal monitors a first physical downlink control channel (PDCCH) having first scheduling information, and monitors a second PDCCH having second scheduling information based on the first scheduling information. The second scheduling information includes resource allocation for a plurality of serving cells.

14 Claims, 6 Drawing Sheets

METHOD AND APPARATUS FOR MONITORING SCHEDULING INFORMATION

CROSS-REFERENCE TO RELATED APPLICATIONS

This application is the National Stage filing under 35 U.S.C. 371 of International Application No. PCT/KR2012/000932, filed on Feb. 8, 2012, which claims the benefit of U.S. Provisional Application Ser. No. 61/441,614, filed on Feb. 10, 2011, the contents of which are all hereby incorporated by reference herein in their entirety.

BACKGROUND OF THE INVENTION

1. Field of the invention

The present invention relates to wireless communications, and more particularly, to a method and apparatus for monitoring scheduling information in a wireless communication system.

2. Related Art

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PDCCH is a control channel for carrying a downlink resource assignment and an uplink resource assignment. Blind decoding is used to receive the PDCCH. A user equipment (UE) does not know when and whether the PDCCH is received. The UE detects its PDCCH by monitoring whether the PDCCH is received in a specific region.

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports. The carrier aggregation and the MIMO technique are for massive data processing.

A PDCCH structure currently used in 3GPP LTE may not be suitable for the massive data processing and newly introduced techniques.

SUMMARY OF THE INVENTION

The present invention provides a method and apparatus for monitoring scheduling information in a wireless communication system.

In an aspect, a method of monitoring scheduling information in a wireless communication system is provided. The method includes monitoring, by a user equipment, a first physical downlink control channel (PDCCH) having first scheduling information, and monitoring, by the user equipment, a second PDCCH having second scheduling information on the basis of the first scheduling information. The second scheduling information includes a resource assignment for a plurality of serving cells.

The first PDCCH and the second PDCCH may be monitored in the same subframe of the same serving cell.

In another aspect, an apparatus for monitoring scheduling information in a wireless communication system is provided. The apparatus includes a radio frequency (RF) unit configured to transmit and receive a radio signal, and a processor operably coupled to the RF unit and configured to monitor a first physical downlink control channel (PDCCH) having first scheduling information, and monitor a second PDCCH having second scheduling information on the basis of the first scheduling information. The second scheduling information includes a resource assignment for a plurality of serving cells.

It is possible to decrease the occurrence of physical downlink control channel (PDCCH) blocking caused by massive traffic. It is also possible to decrease a load of blind decoding of a PDCCH and to decrease battery consumption of a user equipment.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
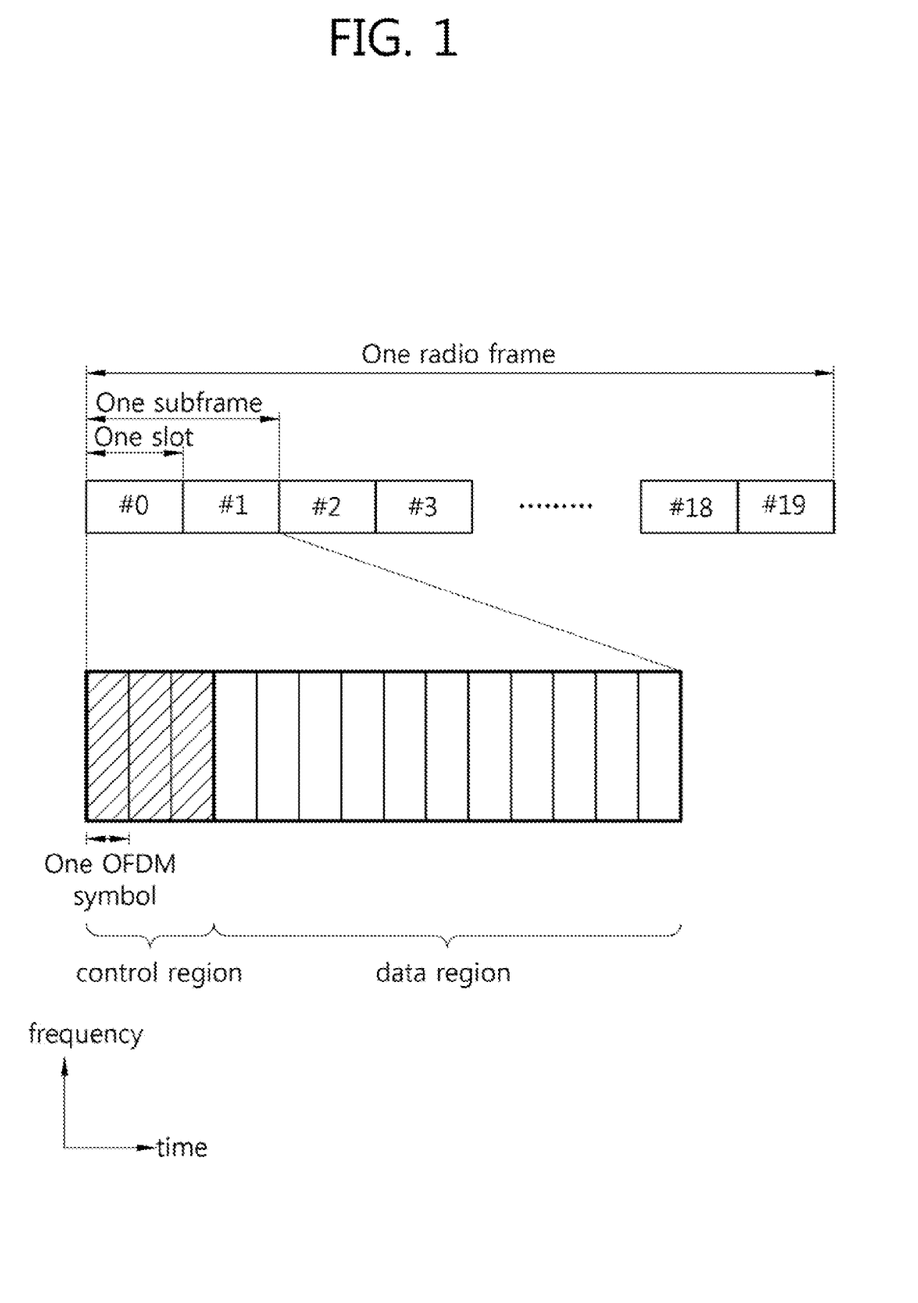
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in four preceding OFDM symbols in a $2^{nd}$ slot of a $1^{st}$ subframe of a radio frame. The PBCH carries system information necessary for communication between the UE and the BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

In 3GPP LTE, transmission of a DL data packet is performed in a pair of the PDCCH and the PDSCH. Transmission of a UL data packet is performed in a pair of the PDCCH and the PUSCH. For example, the UE receives the DL data packet on a PDSCH indicated by the PDCCH. The UE receives a DL resource assignment on the PDCCH by monitoring the PDCCH in a DL subframe. The UE receives the DL data packet on a PDSCH indicated by the DL resource assignment.

Figure 2:
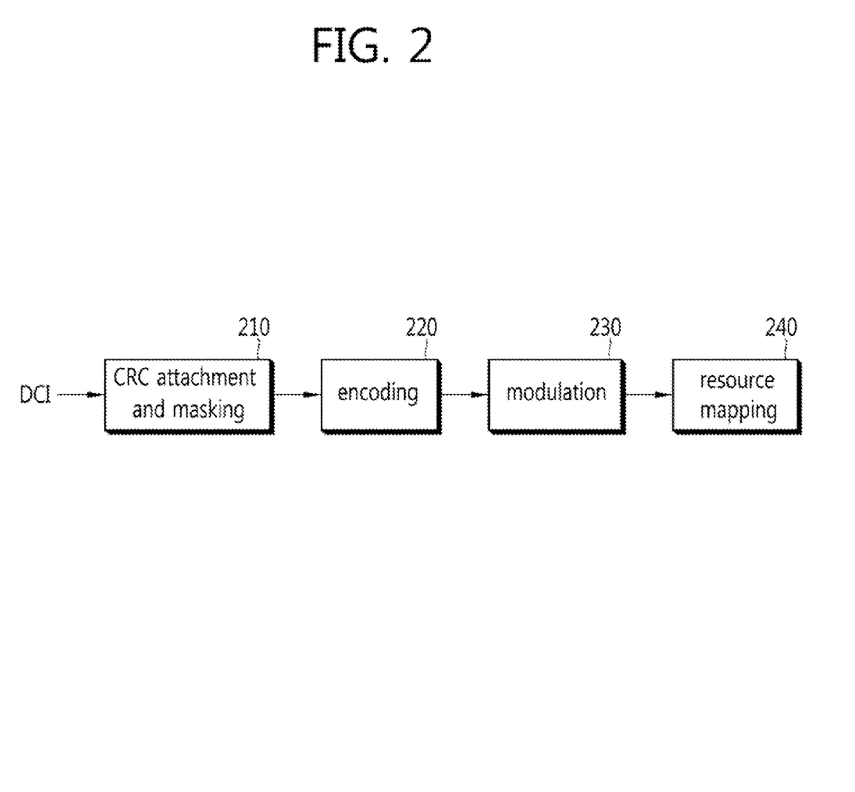
FIG. 2 shows a structure of a physical downlink control channel (PDCCH).

FIG. 2 shows a structure of a PDCCH. A BS determines a PDCCH format according to DCI to be transmitted to a UE, attaches a cyclic redundancy check (CRC) to control information, and masks a unique identifier (referred to as a radio network temporary identifier (RNTI)) to the CRC according to an owner or usage of the PDCCH (step 210).

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. To indicate a transmit power control (TPC) command for a plurality of UEs, a TPC-RNTI may be masked to the CRC.

When the C-RNTI is used, the PDCCH carries control information for a specific UE (such information is called UE-specific control information), and when other RNTIs are used, the PDCCH carries common control information received by all or a plurality of UEs in a cell.

The CRC-attached DCI is encoded to generate coded data (step 220). Encoding includes channel encoding and rate matching.

The coded data is modulated to generate modulation symbols (step 230).

The modulation symbols are mapped to physical resource elements (REs) (step 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a UE having a good DL channel state can use one CCE in PDCCH transmission. A UE having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
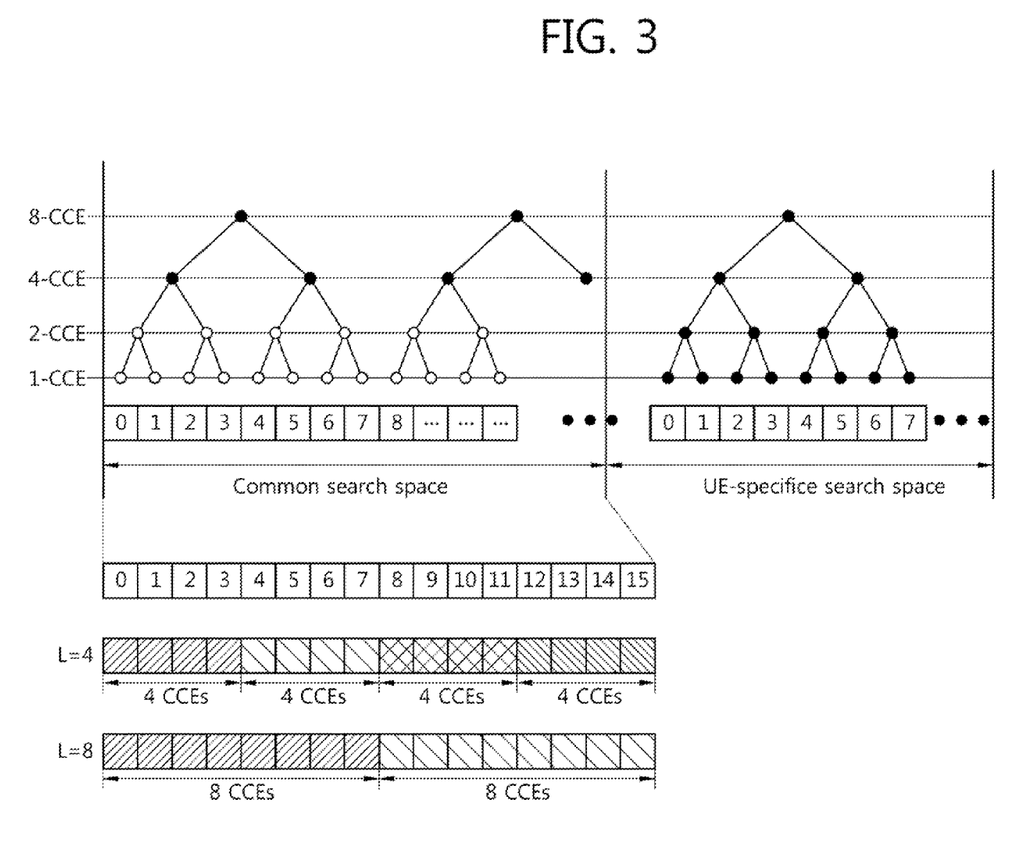
FIG. 3 shows an example of monitoring a PDCCH.

FIG. 3 shows an example of monitoring a PDCCH. The section 9 of 3GPP TS 36.213 V8.7.0 (2009-05) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A UE cannot know about a specific position in a control region in which its PDCCH is transmitted and about a specific CCE aggregation or DCI format used for PDCCH transmission.

A plurality of PDCCHs can be transmitted in one subframe. The UE monitors the plurality of PDCCHs in every subframe. Monitoring is an operation of attempting PDCCH decoding by the UE according to a format of the monitored PDCCH.

The 3GPP LTE uses a search space to reduce a load of blind decoding. The search space can also be called a monitoring set of a CCE for the PDCCH. The UE monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the UE.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1,2,3,4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m) \bmod \lfloor N_{CCE,k}/L \rfloor\} + i \quad \text{[Equation 1]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \quad \text{[Equation 2]}$$

Herein, $Y_{-1} = n_{RNTI} \neq 0$, A=39827, D=65537, k=floor($n_s$/2), and $n_s$ denotes a slot number in a radio frame.

When the UE monitors the PDCCH by using the C-RNTI, a search space and a DCI format to be monitored are determined according to a transmission mode of the PDSCH. Table 2 below shows an example of PDCCH monitoring in which the C-RNTI is set.

TABLE 2

| Transmission mode | DCI format | Search space | Transmission mode of PDSCH based on PDCCH |
|---|---|---|---|
| Mode 1 | DCI format 1A | common and UE specific | Single antenna port, port 0 |
| | DCI format 1 | UE specific | Single antenna port, port 0 |
| Mode 2 | DCI format 1A | common and UE specific | Transmit diversity |
| | DCI format 1 | UE specific | Transmit diversity |
| Mode 3 | DCI format 1A | common and UE specific | Transmit diversity |
| | DCI format 2A | UE specific | CDD (Cyclic Delay Diversity) or Transmit diversity |
| Mode 4 | DCI format 1A | common and UE specific | Transmit diversity |
| | DCI format 2 | UE specific | Closed-loop spatial multiplexing |
| Mode 5 | DCI format 1A | common and UE specific | Transmit diversity |
| | DCI format 1D | UE specific | MU-MIMO(Multi-user Multiple Input Multiple Output) |
| Mode 6 | DCI format 1A | common and UE specific | Transmit diversity |
| | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
| | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
| | DCI format 2B | UE specific | Dual layer transmission (port 7 or 8), or single antenna port, port 7 or 8 |

The usage of the DCI format is classified as shown in Table 3 below.

TABLE 3

| DCI format | Contents |
| --- | --- |
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC may be mapped to one cell. Therefore, when a UE communicates with a BS through a plurality of CCs, it can be said that the UE receives a service from a plurality of serving cells.

Figure 4:
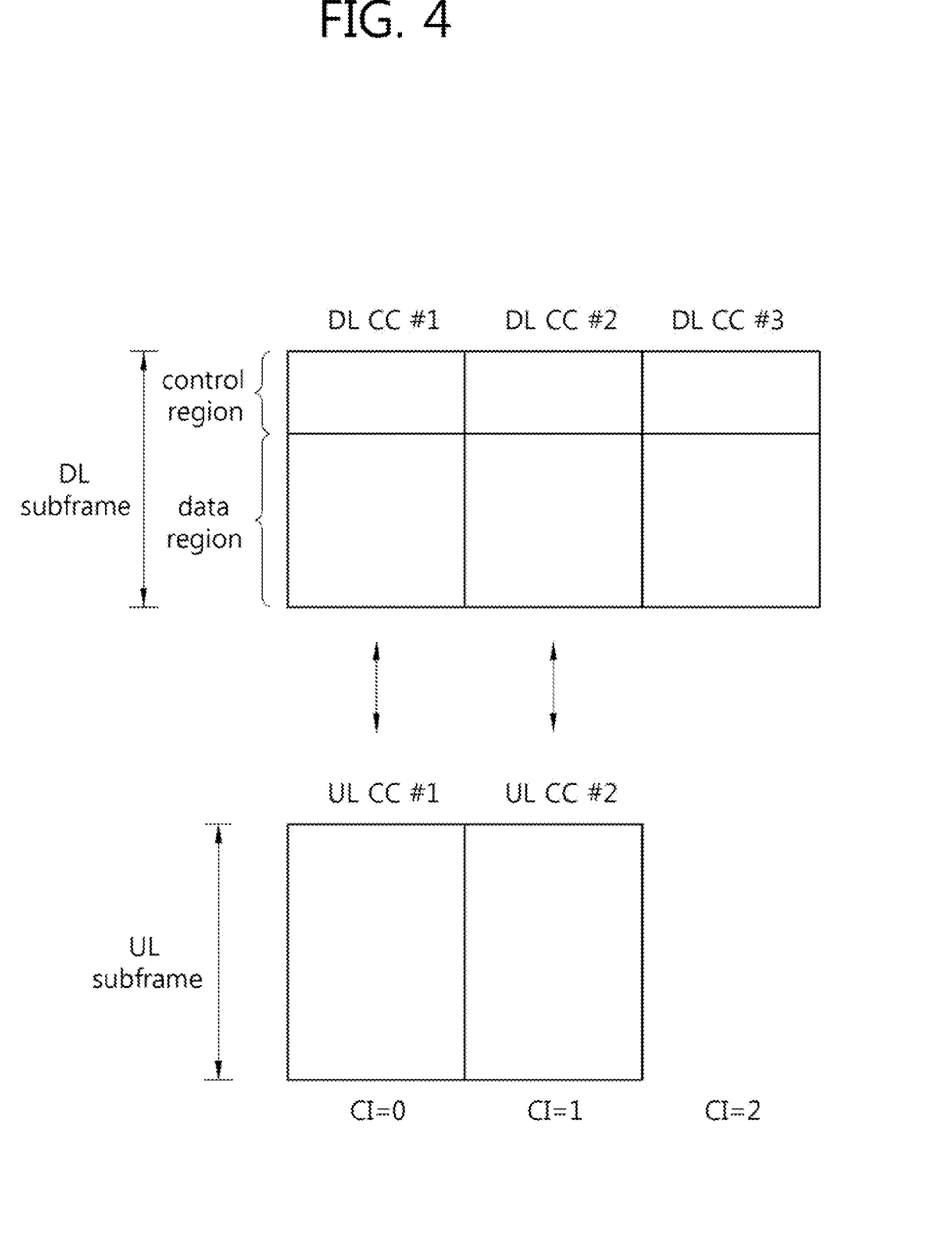
FIG. 4 shows an example of multiple carriers.

FIG. 4 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC. Since three DL CC-UL CC pairs are defined, it can be said that a UE receives a service from three serving cells.

The UE can monitor the PDCCH in a plurality of DL CCs, and can receive a DL transport block simultaneously via the plurality of DL CCs. The UE can transmit a plurality of UL transport blocks simultaneously via a plurality of UL CCs.

It is assumed that a pair of a DL CC #1 and a UL CC #1 is a $1^{st}$ serving cell, a pair of a DL CC #2 and a UL CC #2 is a $2^{nd}$ serving cell, and a DL CC #3 is a $3^{rd}$ serving cell. Each serving cell can be identified by using a cell index (CI). The CI may be cell-specific or UE-specific. Herein, CI=0, 1, 2 are assigned to the $1^{st}$ to $3^{rd}$ serving cells for example.

The serving cell can be classified into a primary cell and a secondary cell. The primary cell operates at a primary frequency, and is a cell designated as the primary cell when the UE performs an initial network entry process or starts a network re-entry process or performs a handover process. The primary cell is also called a reference cell. The secondary cell operates at a secondary frequency. The secondary cell can be configured after an RRC connection is established, and can be used to provide an additional radio resource. At least one primary cell is always configured. The secondary cell can be added/modified/released by higher-layer signaling (e.g., RRC messages).

The CI of the primary cell may be fixed. For example, a lowest CI can be designated as a CI of the primary cell. It is assumed hereinafter that the CI of the primary cell is 0 and a CI of the secondary cell is allocated sequentially starting from 1.

The UE can monitor a PDCCH through a plurality of serving cells. However, even if there are N serving cells, the BS can be configured to monitor the PDCCH for M (M≤N) serving cells. In addition, the BS can be configured to preferentially monitor the PDCCH for L (L≤M≤N) serving cells.

The multiple carrier system can use two types of scheduling.

First, according to per-CC scheduling, PDSCH scheduling is performed only in each serving cell. A PDSCH of a primary cell is scheduled in a PDCCH of the primary cell, and a PDSCH of a secondary cell is scheduled in a PDCCH of the secondary cell. Accordingly, a PDCCH-PDSCH structure of the conventional 3GPP LTE can be directly used.

Second, according to cross-CC scheduling, a PDCCH of each serving cell can schedule not only its PDSCH but also a PDSCH of another serving cell.

A serving cell in which the PDCCH is transmitted is called a scheduling cell, and a serving cell in which the PDSCH to be scheduled is transmitted through the PDCCH of the scheduling cell is called a scheduled cell. The scheduling cell may also be called a scheduling CC, and the scheduled CC may also be called a scheduled CC. According to the per-CC scheduling, the scheduling cell and the scheduled cell are identical. According to the cross-CC scheduling, the scheduling cell and the scheduled cell may be identical or different.

For the cross-CC scheduling, a carrier indicator field (CIF) is introduced in DCI. The CIF includes a CI of a cell having a PDSCH to be scheduled. It can be said that the CIF indicates a CI of a scheduled cell. According to the per-CC scheduling, the CIF is not included in DCI of a PDCCH. According to the cross-CC scheduling, the CIF is included in the DCI of the PDCCH.

The BS can configure the per-CC scheduling or the cross-CC scheduling in a cell-specific or UE-specific manner. For example, the BS can configure the cross-CC scheduling to a specific UE by using a higher layer message such as an RRC message.

Even if there are a plurality of serving cells, the BS may monitor the PDCCH only in a specific serving cell to decrease a load of blind decoding. A cell activated to monitor the PDCCH is called an activated cell (or a monitoring cell).

For each serving cell, a CCE corresponding to a PDCCH candidate m of a search space $S^{(L)}_k$ can be given by Equation 3 below.

$$L \cdot \{(Y_k + m') \bmod \lfloor N_{CCE,k}/L \rfloor\} + i \qquad \text{[Equation 3]}$$

Herein, m'=m+$M^{(L)}$n$_{CI}$, where n$_{CI}$ is a value given in a CIF. Other parameters are defined to the same as those of Equations 1 and 2.

The UE searches for a common search space in the primary cell.

A UE configured to the per-CC scheduling can monitor a UE-specific search space with respect to a PDCCH not having a CIF in each activated serving cell.

A UE configured to the cross-CC scheduling can monitor a UE-specific search space with respect to a PDCCH having a CIF in each activated serving cell. If a UE is configured to monitor a PDCCH having a CIF corresponding to a secondary cell in another serving cell, the UE may not monitor the PDCCH of the secondary cell.

Irrespective of the per-CC scheduling or the cross-CC scheduling, one PDCCH schedules only one cell (i.e., one PDSCH). In addition, a search space of a scheduled cell in a control area of a scheduling cell is defined per each scheduled cell. If a load of a PDCCH is increased due to an abrupt traffic increase or simultaneous scheduling for a plurality of UEs, the respective UEs may have an overlapping search space, which may cause PDCCH blocking in which the PDCCH cannot be transmitted in a corresponding subframe.

For example, a case may occur in which a PDCCH of a specific UE can be transmitted at a CCE aggregation level 1 or 2 but the PDCCH of the specific UE must be transmitted at a CCE aggregation level 4 or 8 due to overlapping with a search space for a PDCCH of other UEs. PDCCH blocking may be increased due to a PDCCH encoded at an undesired high CCE aggregation level.

2-step scheduling based on a primary PDCCH (P-PDCCH) and a secondary PDCCH (S-PDCCH) is proposed according to the present invention.

Figure 5:
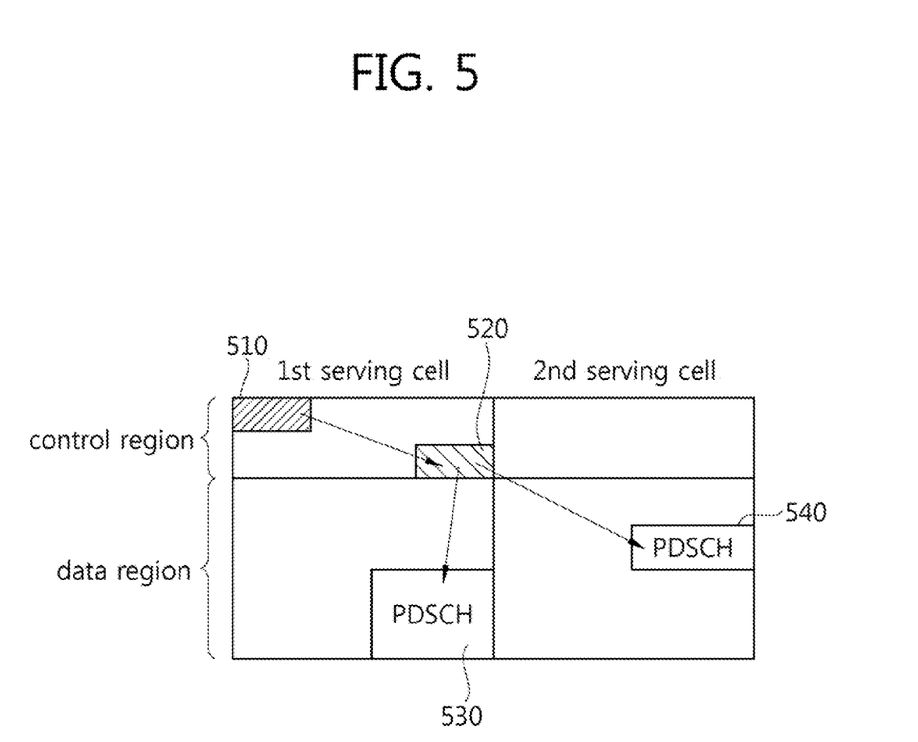
FIG. 5 shows monitoring of scheduling information according to an embodiment of the present invention.

FIG. 5 shows monitoring of scheduling information according to an embodiment of the present invention.

A UE first detects a P-PDCCH 510. Then, the UE detects an S-PDCCH 520 corresponding to the P-PDCCH 510 on the basis of information on the P-PDCCH 510. The S-PDCCH 520 may include scheduling information for a plurality of serving cells.

Although it is exemplified that the S-PDCCH 520 includes scheduling information on a PDSCH 530 of a first serving cell and a PDSCH 540 of a second serving cell, there is no restriction on the number of cells to be scheduled. In addition, the S-PDCCH 520 may include UL scheduling information.

Now, 2-step scheduling using the P-PDCCH and the S-PDCCH will be described in greater detail.

The P-PDCCH can be masked to the same RNTI (e.g., C-RNTI). Alternatively, the P-PDCCH can be masked to a primary RNTI, and the S-PDCCH can be masked to a secondary RNTI. The primary RNTI is a common, group-specific, and/or UE-specific RNTI defined for the P-PDCCH. The secondary RNTI may be a UE-specific RNTI, for example, C-RNTI.

The S-PDCCH can be transmitted in a control region of a subframe by being encoded in the same manner as that used in the existing PDCCH. Alternatively, the S-PDCCH can be transmitted in a data region of a subframe by being encoded in the same manner as that used in the PDSCH (or the exiting PDCCH).

Whether to apply the 2-step scheduling (or whether to use the S-PDCCH) can be determined in a cell-specific or UE-specific manner.

A cell to which the 2-step scheduling is applied may be all of a plurality of serving cells configured to the UE or an activated cell. The BS may report to the UE the cell to which the 2-step scheduling is applied.

The S-PDCCH may carry scheduling information on a plurality of CCs, that is, DCI for a plurality of serving cells. The P-PDCCH may carry information regarding the S-PDCCH, for example, information regarding a cell to be scheduled, a per-cell DCI format, a search space in which the S-PDCCH is transmitted, a CCE aggregation level at which the S-PDCCH is transmitted, etc.

The UE may detect the P-PDCCH, thereafter recognize a transmission location or a payload size of the S-PDCCH corresponding to the P-PDCCH on the basis of information on the P-PDCCH, and thereafter attempt to detect the S-PDCCH.

The UE may attempt to detect the corresponding S-PDCCH only when the P-PDCCH is successfully detected. The UE may be configured to monitor the P-PDCCH preferentially over a normal PDCCH. Herein, the normal PDCCH implies a PDCCH used in itself for typical 1-step scheduling indicating the PDSCH. If the P-PDCCH is successfully detected, the UE may no longer monitor the normal PDCCH. That is, upon detection of the P-PDCCH, the UE can stop monitoring of the normal PDCCH for all or some of the plurality of serving cells. If the P-PDCCH is successfully detected, the UE does not monitor the normal PDCCH for a cell to be scheduled by the P-PDCCH and/or the S-PDCCH.

The DCI on the P-PDCCH may include at least any one of the followings.

(1) A target field for reporting a scheduling cell: It can indicate a bitmap or an index of a serving cell to be scheduled by an S-PDCCH.

(2) An indication field for reporting a DCI format: It can indicate information regarding a payload of an S-PDCCH or a DCI format to be scheduled in each serving cell.

(3) A monitoring field for monitoring an S-PDCCH: It can indicate a search space in which the S-PDCCH is transmitted, a CCE aggregation level, a resource for transmitting the S-PDCCH, etc.

The DCI on the S-PDCCH includes information for scheduling a PDSCH/PUSCH for one or more serving cells. The scheduling information may include a PDSCH/PUSCH assignment in the order of cells corresponding to the target field and the indication field.

The PDSCH/PUSCH assignment of the S-PDCCH may omit a CIF, a DL/UL flag, and a padding bit included in the existing DCI format.

In an S-PDCCH having a DL resource assignment, a transmit power control (TPC), an ACK/NACK resource indictor (ARI), and a DL-downlink assignment index (DL-DAI) can be defined with one value as common information of each scheduling cell. The DL-DAI indicates the accumulated number of PDCCHs having assigned PDSCH transmission. However, the DL-DAI may be given to each scheduling cell.

In an S-PDCCH having a UL resource assignment, a channel quality indicator (CQI) request, a cyclic shift of a demodulation reference signal (DMRS), and a UL-DAI can be defined with one value as common information of each scheduling cell. When an aperiodic CQI is triggered at the CQI request, the UE can feed back the CQI in a cell having a lowest CC index.

The following methods can be considered to decrease waste of a CCE and PDCCH blocking and to decrease a size of a payload constituting the P-PDCCH/S-PDCCH and the number of blind decoding attempts.

First, in case of operating with cross-CC scheduling, there is a high possibility that the waste of the CCE and the PDCCH blocking are increased due to overlapping between a plurality of search spaces with respect to one UE. Therefore, it can be considered to apply the aforementioned 2-step scheduling only when the cross-CC scheduling is configured.

Second, the P-PDCCH/S-PDCCH can be restricted to be transmitted only in a specific serving cell. The P-PDCCH/S-PDCCH can be monitored only in an activated cell or can be monitored only in a primary cell. The P-PDCCH/S-PDCCH can be monitored in a serving cell in which system information is transmitted and/or a serving cell capable of PUCCH transmission.

A PUCCH resource for ACK/NACK transmission can be determined based on an index of a CCE used in the P-PDCCH and/or the S-PDCCH.

In particular, when only the P-PDCCH is successfully detected and detection of the S-PDCCH fails, the UE can report a success/failure of the S-PDCCH detection. The UE can report the failure of the S-PDCCH by using a PUCCH resource linked to an index of a CCE of the P-PDCCH. The failure of the S-PDCCH detection can be transmitted by using a 1-bit field or by using on-off keying (i.e., it indicates a failure if a detection failure is transmitted, and indicates a success if the detection failure is not transmitted).

Third, in case of the S-PDCCH, since scheduling information for a plurality of CCs is included, a payload size is larger than that of the P-PDCCH. Therefore, a size of an available CCE aggregation level of the S-PDCCH can be restricted to a specific aggregation level. For example, the S-PDCCH can use a CCE aggregation level of {4, 8}, whereas P-PDCCH uses a CCE aggregation level of {1, 2, 4, 8}.

A plurality of PUCCH resources linked to indices of a plurality of CCEs used by the S-PDCCH can be used in ACK/NACK transmission for a plurality of PDSCHs (and other DL channels requiring ACK/NACK transmission) to be scheduled by the S-PDCCH.

Fourth, a P-PDCCH/S-PDCCH for DL scheduling for a plurality of serving cells and a P-PDCCH/S-PDCCH for UL scheduling for a plurality of serving cells may exist separately. Alternatively, since massive data traffic is generated only for DL traffic in general, the aforementioned 2-step scheduling may be applied only to DL scheduling.

Fifth, a serving cell to which the 2-step scheduling is applied may be a serving cell configured to the same bandwidth and/or the same transmission mode. A DCI format for each serving cell in the S-PDCCH can be equally restricted.

Sixth, since a primary cell can be used for transmission of system information and semi-persistent scheduling (SPS) data, the 2-step scheduling may not be applied. The 2-step scheduling may be applied only to the secondary cell.

The aforementioned first to sixth methods can be implemented independently or in combination.

In order to decrease a blind decoding load caused by double detection of the P-PDCCH/S-PDCCH, the existing DCI format used in a normal PDCCH can be reused. A DCI format that can be commonly used for all serving cells and transmission modes can be used for the P-PDCCH. This is called a P-DCI format. The P-DCI format may include at least one of a DCI format 0 and a DCI format 1A.

By reference, since only one serving cell exists for one UE in the existing 3GPP LTE, a size of a CQI request field in the DCI format 0 is 1 bit. However, with the introduction of a plurality of serving cells, 2 bits are considered as the size of the CQI request field in the DCI format 0 to enable a CQI request for a plurality of serving cells. To allow the DCI format 0 and the DCI format 1A to have the same payload size, a padding bit can be added to the DCI format 1A by the number of bits (i.e., 1 bit) of the CQI request field.

The following methods can be considered to distinguish whether the DCI received by the UE is for the normal PDCCH or for the P-PDCCH.

First, a 1-bit flag is added in the P-DCI format to distinguish the P-PDCCH and the normal PDCCH. If the flag indicates the P-PDCCH, the UE can recognize that the remaining fields are used for the P-PDCCH. If the flag indicates the normal PDCCH, the UE can recognize that the remaining fields are used for the normal PDCCH.

Second, when the DCI format 1A is used as the P-DCI format, the padding bit can be used as a flag for identifying the P-DCI format. For example, if the padding bit is set to '1', the UE can recognize that the received DCI format 1A is for the P-PDCCH.

Third, when the DCI format 0 is used as the P-DCI format, a resource allocation field in the DCI format 0 can be used as a flag for identifying the P-DCI format. For example, if the resource allocation field is fully set to '1', the UE can recognize that the received DCI format 0 is for the P-PDCCH.

Figure 6:
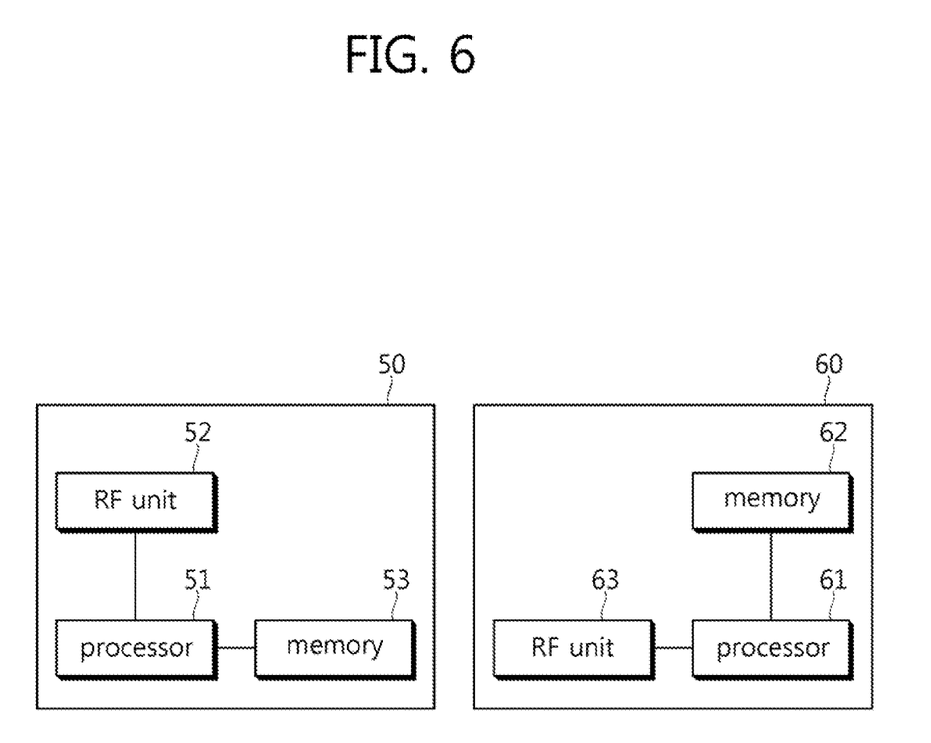
FIG. 6 is a block diagram showing a wireless communication system according to an embodiment of the present invention.

FIG. 6 is a block diagram showing a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, processes, and/or methods. In the aforementioned embodiments of FIG. 5, the operation of the BS can be implemented by the processor 51.

The UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, processes, and/or methods. In the aforementioned embodiments of FIG. 5, the operation of the UE can be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of monitoring scheduling information in a wireless communication system, the method comprising:

monitoring, by a user equipment, a first physical downlink control channel (PDCCH) having first scheduling information in a subframe of a first downlink carrier, the subframe including 3 symbols for a control region and 11 symbols for a data region;

monitoring, by the user equipment, a second PDCCH in the subframe of the first downlink carrier, based on the first scheduling information, the second PDCCH having second scheduling information on, wherein the first PDCCH is received in the 3 symbols for the control region of the subframe of the first downlink carrier, while the second PDCCH is received in the 11 symbols for the data region of the subframe of the first downlink carrier; and reporting, by the user equipment, a failure of the second PDCCH when the first PDCCH only detects that the second PDCCH fails by using an on-off keying that indicates the failure when the detection failure is transmitted and indicates a success when the detection failure is not transmitted, wherein the first scheduling information includes information for monitoring the second PDCCH in the data region of the subframe of the first downlink carrier, and wherein the second scheduling information includes each of a first resource assignment on the first downlink carrier, a second resource assignment on a second downlink carrier and an uplink resource assignment.

2. The method of claim 1, wherein the first scheduling information includes information indicating a plurality of serving cells.

3. The method of claim 1, wherein the first scheduling information further includes information regarding a payload size of the second scheduling information.

4. The method of claim 1, wherein the first scheduling information includes information indicating a radio resource to which the second PDCCH is assigned.

5. The method of claim 1, wherein a cyclic redundancy check (CRC) of the first scheduling information and a CRC of the second scheduling information are masked with different identifiers.

6. The method of claim 1, wherein at least one of the first and second resource assignments in the second scheduling information includes a resource assignment for a plurality of physical downlink shared channel (PDSCHs) for a plurality of serving cells.

7. The method of claim 1, wherein the uplink resource assignment in the second scheduling information includes a resource assignment for a plurality of physical uplink shared channel (PUSCHs) for a plurality of serving cells.

8. The method of claim 1, wherein the first PDCCH and the second PDCCH are monitored in a primary cell.

9. An apparatus for monitoring scheduling information in a wireless communication system, the apparatus comprising:
   a radio frequency (RF) unit configured to transmit and receive a radio signal; and
   a processor operably coupled to the RF unit and configured to:
   monitor a first physical downlink control channel (PDCCH) having first scheduling information in a subframe of a first downlink carrier, the subframe including 3 symbols for a control region and 11 symbols for a data region;
   monitor a second PDCCH in the subframe of the first downlink carrier, based on the first scheduling information, the second PDCCH having second scheduling information; and
   report a failure of the second PDCCH when the first PDCCH only detects that the second PDCCH fails by using an on-off keying that indicates the failure when the detection failure is transmitted and indicates a success when the detection failure is not transmitted, wherein the first PDCCH is received in the 3 symbols for the control region of the subframe of the first downlink carrier, while the second PDCCH is received in the 11 symbols for the data region of the subframe of the first downlink carrier, wherein the first scheduling information includes information for monitoring the second PDCCH in the data region of the subframe of the first downlink carrier, and wherein the second scheduling information includes each of a first resource assignment on the first downlink carrier, a second resource assignment on a second downlink carrier and an uplink resource assignment.

10. The apparatus of claim 9, wherein the first scheduling information includes information indicating a plurality of serving cells.

11. The apparatus of claim 9, wherein the first scheduling information further includes information regarding a payload size of the second scheduling information.

12. The apparatus of claim 9, wherein the first scheduling information includes information indicating a radio resource to which the second PDCCH is assigned.

13. The method of claim 1, wherein the first scheduling information in the first PDCCH includes:
   a target field for indicating a serving cell to be scheduled by the second PDCCH;
   an indication field for indicating information regarding a payload size of the second PDCCH or a format of downlink control information (DCI); and
   a monitoring field for indicating a search space in which the second PDCCH is transmitted, an aggregation level of control channel elements (CCEs), a resource of the second PDCCH.

14. The apparatus of claim 9, wherein the second scheduling information in the first PDCCH includes:
   a target field for indicating a serving cell to be scheduled by the first PDCCH;
   an indication field for indicating information regarding a payload size of the second PDCCH or a format of downlink control information (DCI); and
   a monitoring field for indicating a search space in which the second PDCCH is transmitted, an aggregation level of control channel elements (CCEs), a resource of the second PDCCH.

* * * * *